United States Patent [19]
Kurtz et al.

[11] Patent Number: 5,539,236
[45] Date of Patent: Jul. 23, 1996

[54] PIEZORESISTIVE ACCELEROMETER WITH ENHANCED PERFORMANCE

[75] Inventors: Anthony D. Kurtz, Teaneck; Alexander A. Ned, Bloomingdale, both of N.J.

[73] Assignee: Kulite Semiconductor Products, Inc., Leonia, N.J.

[21] Appl. No.: 303,456

[22] Filed: Sep. 9, 1994

Related U.S. Application Data

[62] Division of Ser. No. 78,391, Jun. 16, 1993, Pat. No. 5,425,841.

[51] Int. Cl.$^6$ ............................................. H01L 29/82
[52] U.S. Cl. .......................... 257/415; 257/417; 257/418; 73/514.23; 73/514.34; 73/DIG. 1; 73/DIG. 4
[58] Field of Search .................................. 257/414, 415, 257/417, 418, 419, 420; 73/514.23, 514.34, 720, 721, 726, 727, DIG. 3, DIG. 4, DIG. 1, DIG. 2

[56] References Cited

U.S. PATENT DOCUMENTS

| | | | |
|---|---|---|---|
| 3,456,226 | 7/1969 | Vick | 257/417 X |
| 3,697,918 | 10/1972 | Orth et al. | 257/418 X |
| 4,696,188 | 9/1987 | Higashi | 257/419 X |
| 5,170,237 | 12/1992 | Tsuda et al. | 257/419 |

FOREIGN PATENT DOCUMENTS

| | | | |
|---|---|---|---|
| 55-24408 | 2/1980 | Japan | 257/420 |

*Primary Examiner*—William Mintel
*Attorney, Agent, or Firm*—Plevy & Associates

[57] ABSTRACT

An electromechanical transducer is provided, and the process for making it utilizes a piezoresistive element or gage which is dielectrically isolated from a gap spanning member and substrate upon which it is supported. The gage of the invention is a force gage and is derived from a sacrificial wafer by a series of etching and bonding steps which ultimately provide a gage with substantially reduced strain energy requirements.

11 Claims, 4 Drawing Sheets

PIEZORESISTIVE ACCELEROMETER WITH ENHANCED PERFORMANCE

This is a Division of application Ser. No. 08/078,391, filed Jun. 16, 1993, now U.S. Pat. No. 5,425,841.

BACKGROUND OF THE INVENTION

This invention relates to semiconductor devices generally, and more particularly, to an improved accelerometer or transducer structure capable of converting mechanical movements or displacements into electrical signals.

It is well known in the prior art that a slotted metal cantilever beam will have most of its deflection occurring across the slot. In U.S. Pat. No. 3,351,880 issued to Wilner in Nov. 30, 1976, it is disclosed that if a sensor, whose inherent stiffness is small compared to the stiffness of the remaining material under the slot, is used to span the slot, then the slot displacement will be transferred to the sensor. In certain embodiments, the sensor was cemented or directed across the slot. The resulting strain in the sensor will be the displacement across the slot divided by the slot width. To achieve maximum performance, the slot must be as narrow as possible. However, for small slot widths and in order to obtain sufficient resistance in the sensor, the cross section of the sensor must be very small. Using a sensor of such small cross section makes the device very fragile and difficult to fabricate. To overcome these problems and to be able to affect the overall stiffness of the slotted beam independent of the stiffness of the sensor, Kurtz one of the inventors herein, taught the use of shim members which bridged the slot onto which sensors were affixed using cements or other bonding agents. See U.S. Pat. No. 3,995,247 entitled TRANSDUCERS EMPLOYING GAP BRIDGING SHIM MEMBERS issued to A. D. Kurtz on Nov. 30, 1976, one of the inventors herein. In this way, the overall reliability of the device was improved and the sensor could be designed independently of the slot-spanning shim.

Details of the mechanical performance as regard to sensitivity and frequency response, are provided in U.S. Pat. No. 3,995,247. The major problem with this improvement and earlier devices was the necessity of using slotted metal beams and using bonding agents to affix the sensors either to the beam itself or to the shim. In addition, forming the slot in the metal was difficult, inaccurate and most important, the narrowest slot widths were on the order of 10 to 50 mils (0.001"–0.005").

In U.S. Pat. No. 4,498,229 entitled PIEZORESISTIVE TRANSDUCER issued on Feb. 12, 1985 to Leslie B. Wilner, it is taught that some of these problems can be avoided by forming an integral unsupported sensor spanning the slot obtained by preferential etching. See also U.S. Pat. No. 4,605,919 issued on Aug. 12, 1986 entitled PIEZORESISTIVE TRANSDUCER, to Wilner and which is a divisional of the '229 patent. By utilizing the integral, unsupported sensor disclosed by Wilner, the slot can be made much smaller and there will be no loss in strain transmission because of slip in the cement. However, this approach again makes the sensor the only mechanical spanning member. For the small spanning lengths possible in such designs, the sensor cross sections are exceedingly small, thus again leading to very fragile structures.

It is an object of the present invention to extend the concept of slot-spanning shims into solid state fabrication to achieve a less expensive and more efficient structure.

SUMMARY OF THE INVENTION

According to the present invention, the entire force transducer is fabricated from a series of silicon wafers or a similar semiconductor material. The resulting silicon structure has a slot etched into the silicon or otherwise defined such that the resulting structure under the application of load will cause the gap defined by the slot to elongate. Spanning the gap are one or more free-standing silicon gap-bridging members. The free-standing silicon gap-bridging member may be fabricated on one slice of silicon which is in turn fusion bonded to a second wafer containing the slot. The gap-bridging member or members are congruent with the slot of the first wafer. On top of the gap-bridging member is bonded, using the method described in recent pending application, a dielectrically isolated serpentine pattern congruent with both gap-bridging member and the slot. An adequate method is described in U.S. application Ser. No. 08/058,400 entitled FUSION BONDING TECHNIQUE FOR USE IN FABRICATING SEMICONDUCTOR DEVICES filed on May 7, 1993 which application is owned by assignee herein and which is incorporated by reference as part of this specification. The cross section of the serpentine member may be of the order of one micron by one micron or less and by using enough turns can be made in any desired resistance value relatively independent of the cross section and length of the gap-bridging member. Thus, the gap-bridging member can be made as short and as stiff as desired for mechanical performance and ruggedness while still obtaining any required sensor resistance. In addition, the pattern will consist of a transverse gage (gage length at right angle to the slot width) and a longitudinal gage (gage length in the direction of the slot width). In this way using two such patterns, a fully active Wheatstone bridge can be made. This will not only give a higher output for any strain, but will also insure better temperature tracking since both the longitudinal and the transverse gage are formed on the same bridge-spanning member. In addition, using dielectric isolation from the free-standing member allows the temperature operation in excess of 500° F.

The device can most conveniently be fabricated using three wafers, the first of which eventually contains the slot leaving an unslotted region of pre-determined thickness, the second wafer eventually contains the free-standing gap bridging member and the third wafer eventually contains the serpentine or zig-zag sensor pattern.

The first wafer will be of n type silicon (100) plane having a thickness from 3 to 20 mils depending on the range, desired sensitivity and frequency response of the finished device. For an equivalent slot width and final thickness of the slot-containing member, the thicker the wafer, the lower the g range, that can be obtained at the same strain level because of the greater mass of the silicon that acts as the seismic system. The wafer is oxidized on the order of 10,000 Å and the oxide is opened to define the slot. Either an anisotropic or straight-walled etch (light assisted) is used to form the slot to the desired depth. The slice is then Boron diffused to a degenerate surface concentration, such diffusion covering the newly etched slot and slot bottom.

The second wafer may also be (100) plane, but a thickness of about 3 mils. This wafer is used to form the free-standing gap-bridging member. The wafer is oxidized and then either patterned on the front surface to define the aforementioned member or the entire oxide may be removed from the front surface. The wafer is then boron diffused with a degenerate surface concentration to a pre-determined depth sufficient to fabricate the free-standing member. The back side of the wafer is now patterned to define a slot congruent with the pattern on the front surface, The oxide is removed from the back surface and the first and second wafers are fusion bonded together taking steps to insure that the two slots are congruent. The composite structure is now oxidized and the third wafer which already has a raised p+ serpentine pattern, is fusion bonded to the front surface of the second wafer again insuring that the serpentine pattern is congruent with the slot defined in the first and second wafer. Using a conductivity selective etch the excess "n" material is etched away leaving the serpentine pattern bonded to the front of the second wafer but dielectrically isolated from the region of free-standing member. If the free-standing member was previously patterned the same etch used to remove excess "n" material from the third wafer will also completely define the free standing member. However, if the P+ layer on the second wafer was not defined, it may now be done by use of photolithography used to protect the serpentine pattern and to define the width of the free-standing member. Metal contacts are now made to the pad areas of the serpentine area and the slice is diced into individual devices. It is also obvious that the order of bonding one wafer to another may be varied for convenience. For instance, the so-called sensor wafer may be bonded to the gap-bridging wafer before the bridging wafer is bonded to the slot wafer.

Using these techniques, the result will be a degenerately doped serpentine layer bonded to, but dielectrically isolated from the free-standing gap-bridging member, such member being designed for maximum sensitivity (fully active bridge) and minimal thermal effects. Moreover, use of a third wafer to determine the range of the device results in a considerable logistic saving since each wafer may be individually fabricated and tailored to a specific application.

DETAILED DESCRIPTION OF THE INVENTION

Figure 1:
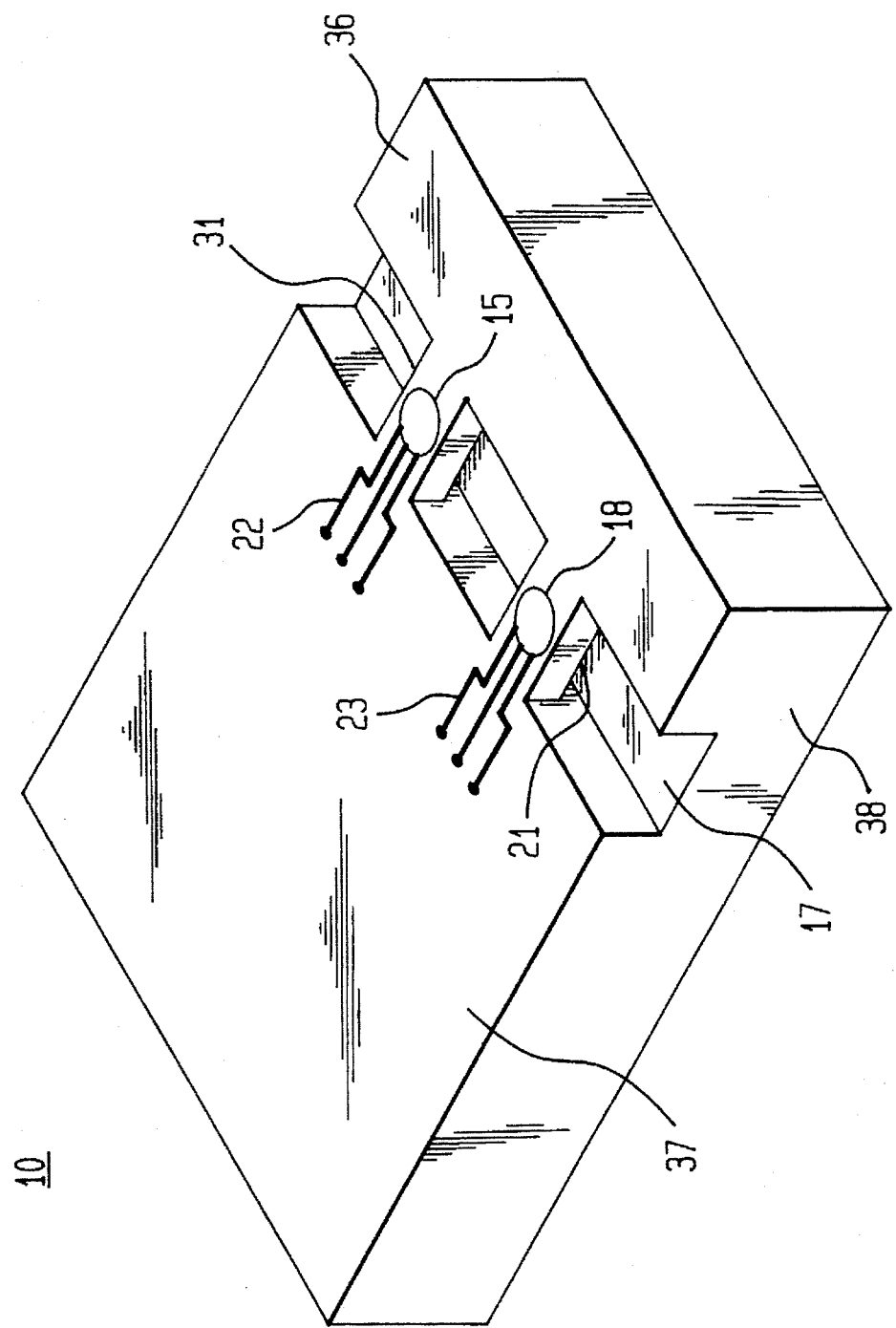
FIG. 1 is a view in perspective of a piezoresistive transducer illustrating the invention in which a single gage is arranged on one side of its respective substrate.

The semiconductor transducer 10 as shown in FIG. 1 is essentially rectangular in configuration and has an elongated aperture or slot 17 which is rectangular in configuration and is disposed upon the top surface of the transducer 10. The slot 17 divides the transducer into a front section 36 and a rear section 37. The reduced area 38 beneath the slot, acts as a hinge to enable the flexure or bending of the transducer 10. Essentially, as seen in FIG. 1, bridging the slot and basically extending from the front section 36 to the rear section 37 are gap-spanning bridges 21 and 31 which, as will be explained, are formed from silicon and are provided by the semiconductor processes to be described herein. While the shapes of the various items are described as rectangular, other geometric shapes will suffice. Each of the spanning bridges as 21 and 31 are integrally formed and are positioned directly across the slot 17 to bridge or cross between the front section 36 and the rear section 37 of the semiconductor member. The front and rear section do not have to be of different dimensions. As will be explained, the gap-bridging or spanning members 21 and 31 are formed during the semiconductor process which as briefly indicated in the summary of the invention may include two or three semiconductor wafers which are processed to enable one to form gap-bridging or spanning members 21 and 31. As seen in FIG. 1, disposed upon each of the gap-bridging or spanning members is a serpentine resistive configuration designated by reference numerals 15 and 18. The serpentine patterns as 15 and 18 essentially are positioned on and dielectrically isolated from the gap-bridging or spanning members 21 and 31. Each pattern is serpentine and includes a plurality of turns or loops to enable large resistive values to be provided. The cross-section of the serpentine members may be of the order of one micron by one micron. In this manner, each of the resistive configurations as 15 and 18 can include a large plurality of turns or zig-zag paths to fabricate a large resistive value in an extremely small space. Each of the gap-bridging members 21 and 31 are integrally fabricated, and can be dimensioned to be relatively sturdy and of a width sufficient to support a desired serpentine resistive structures which are positioned on top. Each of the resistive pattern structures such as 15 and 18 terminate in contact areas as 22 and 23 as is well known. In this manner, each of the resistive patterns can be oriented so each pattern will consist of a transverse gage which is a gage of a length at right angles to the slot width and a longitudinal gage which has a gage length in the direction of the slot width 17. In this manner, each of the spanning arms as 21 and 31 contains a half bridge pattern. The half bridge patterns can be wired to create a full Wheatstone bridge which essentially operates to measure the stress or force across the slot and thereby provide an output proportional thereto. Thus, the entire member shown in FIG. 1 can be utilized as a force transducer or as an accelerometer.

As indicated, contact points from the piezoresistive sensor arrangements 15 and 18 are directed to the contact areas 22 and 23 to enable one to arrange or wire the piezoresistive configurations into a suitable bridge. As one can readily ascertain from FIG. 1, the device essentially has the two thin gap bridges 21 and 31 upon which are disposed the dielectrically isolated piezoresistive sensor arrangements as 15 and 18. As indicated, one of the piezoresistive elements in each bridge section is arranged to be responsive to longitudinal stress and the other sensor is arranged to be responsive to transverse stress.

Referring now to FIGS. 2a–2g, a sequence of steps is shown for processing a single sided suspended gage piezoresistive force transducer from three wafers of silicon crystal material which are bonded together. The drawings are not to scale, but are diagrammatic only to explain the pertinent process steps. Initially, it should be noted that a plurality of transducers are produced in a single batch process with the number produced constrained only by the dimensions of the composite structure and the form of sensor being developed for the particular application. Once the process steps set forth hereinbelow have been performed in accordance with the present invention, the individual transducers are diced out of the composite structure.

Figure 2A:
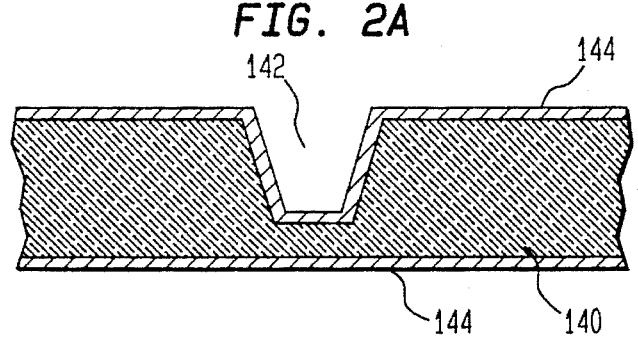
FIGS. 2a–2g are diagrammatic views, in section, illustrating the sequential processing conditions of the invention, as the wafers are processed in accordance with inventive method of the present invention.

In accordance with the illustrative embodiment of the inventive technique, a sequence of steps illustrated in FIGS. 2a through 2g will now be described. With reference to FIG. 2a, it will be seen that a first n-type wafer of silicon crystal material 140 having a thickness of between 0.005 and 0.020 inches which will become the slot containing wafer is selected. The wafer will be circular or rectangular in the top plan view and is in the (100) plane. The wafer is then oxidized and patterned photolithographically and etched with an anisotropic etch such as KOH to a depth of 0.004 to 0.018 inches to form grooves or channels 142, the thickness of the remaining material determined by desired range and frequency response of the structure. The pattern of grooves should be arranged to accommodate the fabrication of a plurality of transducers, which will be diced out of the composite structure. After the etching is performed, the oxide is removed and boron nitride or $B_2H_6$ is used to form $B_2O_3$ which is diffused equally into all surfaces of the wafer 140 in an amount sufficient to obtain boron in the amount of at least $5\times10^{19}$ atoms per cubic centimeter, but preferably greater than $2\times10^{20}$, and a depth within the range of between about 0.1 and 3 μm. This results in a p+ layer 144 on all surfaces of wafer 140 which will prevent further etching in a conductivity selective etch. It is understood that by p+ we mean the region of the diffusion layer where the concentration is greater than $5\times10^{19}$ atoms/cm$^3$.

Figure 2B:
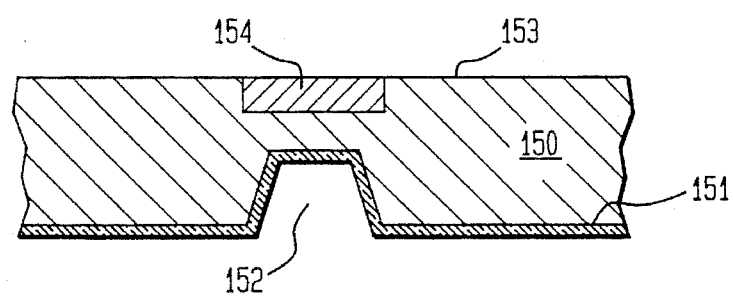

In a similar manner an n-type silicon gap-spanning wafer, 150 which is of order 0.003 to 0.005 inches thick, is etched on surface 151 thereof with a pattern of grooves 152 that is congruent with those of shim wafer 140 to a depth of about 0.001." On opposite side 153 of second wafer 150, p+ areas 154 are defined by the planar diffusion of boron. This may be performed by oxidizing the surface of wafer 150 and etching openings therein to accommodate the diffusion process. As seen in FIG. 2b, p+ areas 154 are then disposed directly above the grooves 152. Alternatively, the entire top surface may be diffused with a p+ layer. The depth of the p+ layer determines the thickness of the gap-spanning member since it becomes free standing after the subsequent conductivity selective etch. It should be in the range 2 to 20 microns thick. Surface 151 of wafer 150 is then oxidized to form an oxide layer 156 which may be on the order of 2,000 to 4,000 angstroms thereon.

Figure 2C:
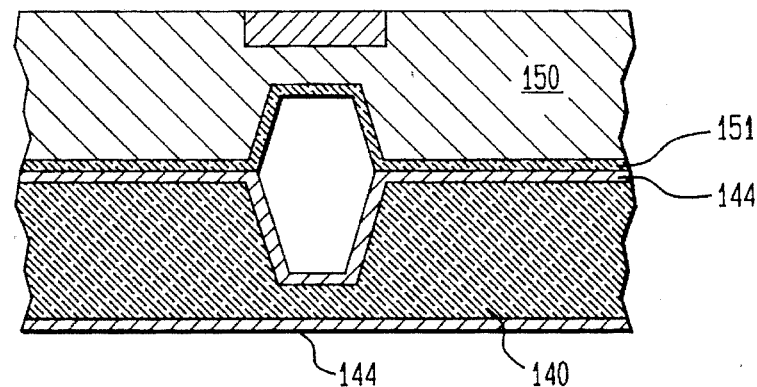

Surface 151 of gap-spanning wafer 150 is now bonded to wafer 140 so that the grooves of each wafer are aligned in the manner depicted in FIG. 2c. This may be accomplished utilizing a fusion bonding process such as that disclosed in the aforementioned copending U.S. patent application Ser. No. 08/056,400. As seen in FIG. 2c, the p+ areas 154, and areas of n-type silicon thereneath, span the grooves.

Figure 2D:
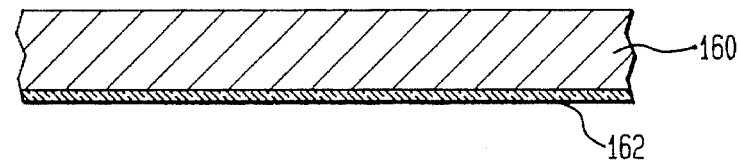
Figure 2E:
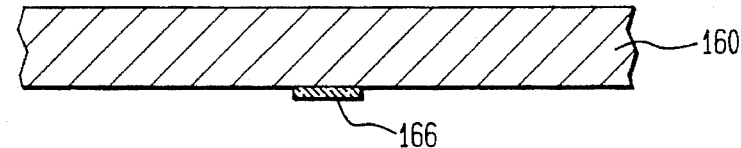

An n-type silicon sensor wafer 160 preferably in the (110) plane and the <111> direction along the longitudinal direction is now prepared by defining respective serpentine gage patterns 166 which are to be aligned with each p+ area 154 on wafer 150. The gage patterns are shown in block form, but comprise serpentine patterns having multiple turns. This may be accomplished by diffusing boron into wafer 160 through holes in an oxide mask to obtain a p+ layer 162 thereon, as shown in FIG. 2d. The boron is diffused in an amount sufficient to obtain boron in the amount of at least $5\times10^{19}$ atoms per cubic centimeter but preferably a concentration of greater than $2\times10^{20}$, and a depth within the range of between about 0.1 and 3 μm, such depth and concentration being sufficient to obtain a desired resistance consistent with the gage geometry. In the illustrative embodiment, the gage patterns 166 which were defined lithographically will have one traverse gage and one longitudinal gage as well as contact pad areas. Because of advances made in planar diffusion techniques, it is now possible to obtain very fine line patterns, thus greatly enhancing the sensitivity of the gages. It should be noted that ion implantation or planar diffusion followed by selective etching could also be employed shown in FIG. 2e. The diffused patterns are then raised after removing the masking oxide using a conductivity selective etch procedure, such etch only removing n-type material.

Figure 2F:
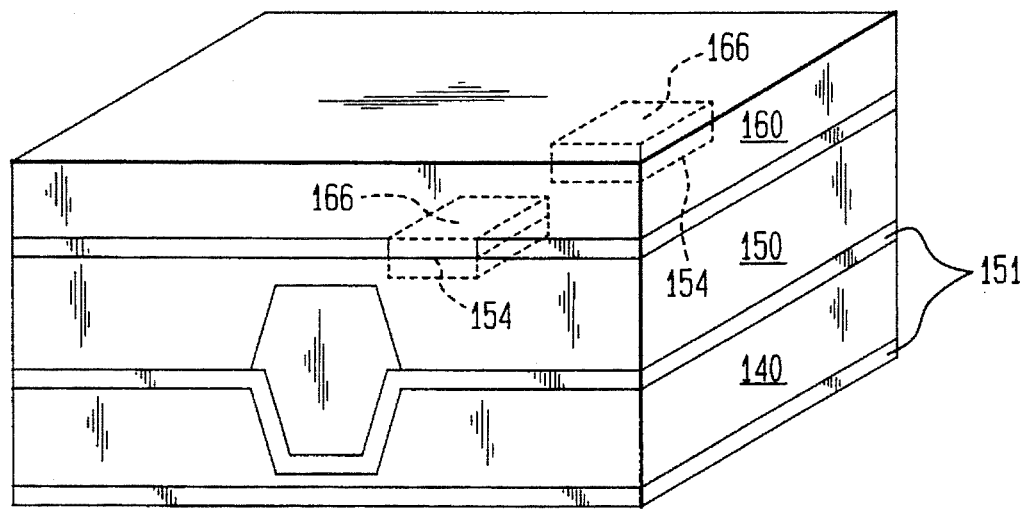
Figure 2G:
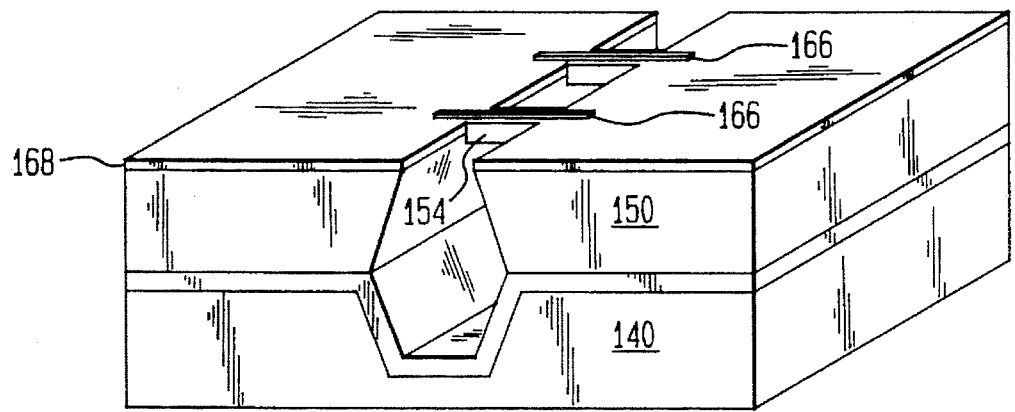

The wafer 160 is now bonded to the unbonded surface of wafer 150 to produce the composite structure shown in FIG. 2f. It will be seen that the gage patterns 166 are aligned with the p+ areas 154 of the second wafer and these in turn are disposed directly over the grooves. The bonding process is in accord with U.S. Ser. No. 08/058,400. It is clear that this process may be performed before or after the gap-bridging slice is bonded to the slot slice. Once the bonding process has been completed, the composite structure is subjected to a conductivity selective etch. This will etch away the unneeded type material of the sensor slice as well as completing the etching of the gap. The p+ type 144 protects wafer 140 from the etch, such that only areas unprotected by the oxide layer and p+ layer are subjected to the etch. It will be readily appreciated that after such an etch, the p+ regions 154 will now be suspended directly over the groove, as shown in FIG. 2g and the gage patterns and contact areas are defined. It will also be observed that the gage patterns 166 are dielectrically isolated from the underlying p+ areas 154 by oxide layer 168, thus enhancing the sensitivity of the resulting transducer. After the p+ serpentine pattern is delineated on the gap-bridging area, if a planar diffusion was used to form the gap-bridging area, this area must be defined in its lateral dimension. This is accomplished with the use of a photolithograhic process which will protect all of the upper surface of the wafer except for the unwanted lateral areas of the gap-bridge. By this means lateral areas of the order of 0.001 to 0.002 inches may be formed commensurate with the device performance requirements. Subsequent to the etching procedure, and the required metallization of the contact areas the composite structure is diced to produce individual transducer such as those shown in FIG. 1.

Figure 2H:
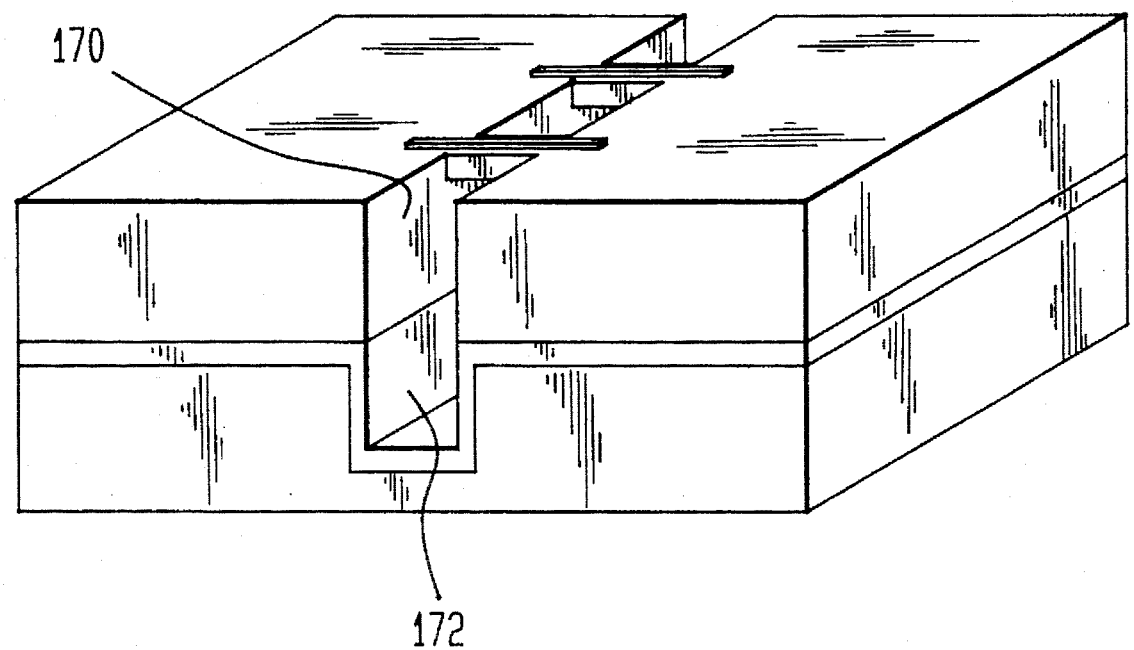
FIG. 2h is a perspective view illustrating a second embodiment of the present invention.

The above described techniques produce a superior cantilever structure which is extremely economical to manufacture and which includes capability of responding to forces along the vertical axis, for example, forces applied downwardly or upwardly as shown in FIG. 1. Such a beam structure, as indicated, enables one to provide a reliable beam structure which avoids many of the disadvantages of prior art structures, as well as providing high temperature operation because the sensor network is dielectrically isolated from the bridge spanning member. It is also understood that the above noted dimensions were given by way of illustration only and one can accommodate many different types of configurations as well as many different types of dimensions utilizing the techniques and structures described above. For example, FIG. 2h, shows a second embodiment of the piezoresistive transducer of the present invention. As can be seen, the sidewalls 172 of the groove 170 are substantially vertical instead of sloping as shown in the previous embodiment.

A piezoresistive force transducer developed in accordance with the procedures set forth above is particularly appropriate for use in accelerometers, pressure transducers, and displacement gages. Although the present invention has been described with reference to particular embodiments, however, workers skilled in the art will recognize that changes may be made in form and detail without departing from the spirit and scope of the invention defined in the appended claims.

What is claimed is:

1. In a device for converting mechanical movement of two relatively movable parts of a mechanical device into mechanical signals, comprising:

a substrate comprised of piezoresistive semiconductor material, said substrate including a groove extending thereacross for defining said relatively movable parts and a spanning member which spans said groove and interconnects said relatively moveable parts;

a serpentine strain sensitive element disposed on said spanning member, said strain sensitive element being derived from the same piezoresistive semiconductive material as said substrate;

a dielectric layer disposed between said spanning member and said strain sensing element.

2. The device according to claim 1, wherein said layer of dielectric material is comprised of silicon dioxide.

3. The device according to claim 1, wherein said substrate is formed of silicon having a first conductivity type.

4. The device according to claim 3, wherein said spanning member element and said sensing element are comprised of P-type silicon.

5. The device according to claim 1, further including a second spanning member and a second strain sensing element disposed thereon and dielectrically isolated therefrom.

6. The device according to claim 1, wherein said first strain sensing element is indexed substantially in the <111> direction.

7. A transducer, comprising:

a body of semiconductor material having a slot directed from one end to another end;

at least one semiconductor bridge spanning said slot; and a semiconductor serpentine sensor positioned on said bridge and dielectrically isolated from said bridge and operative to provide a change in resistance upon flexure of said member.

8. The transducer according to claim 7, wherein said bridge is fabricated from silicon and said sensor is silicon and isolated from said bridge by silicon dioxide.

9. The transducer according to claim 8, wherein said bridge is p+ silicon having a silicon oxide layer on the surface thereof.

10. In a device for converting mechanical movement of two relatively movable parts of a mechanical device into mechanical signals, comprising:

a substrate comprised of silicon semiconductor material of a first conductivity type, said substrate including a groove extending thereacross for defining said relatively movable parts and a spanning member which spans said groove and interconnects said relatively moveable parts, said spanning member being formed of silicon having a conductivity type which is opposite to said first conductivity type;

a serpentine strain sensitive element disposed on said spanning member, said strain sensitive element being derived from the same piezoresistive semiconductive material as said substrate; and a dielectric layer disposed between said spanning member and said strain sensing element.

11. The transducer according to claim 9, wherein said silicon oxide layer is 2000–5000 angstroms.

* * * * *